July 14, 1959     A. H. HABRIGA     2,894,766
HITCH
Filed June 20, 1958
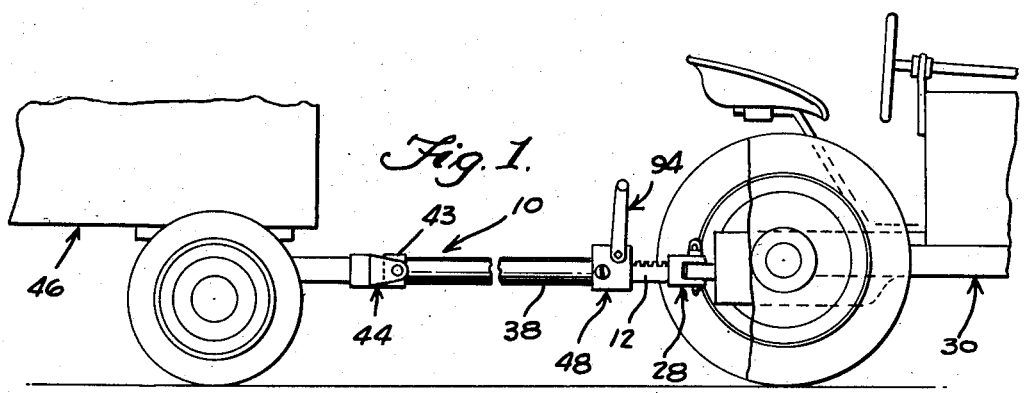
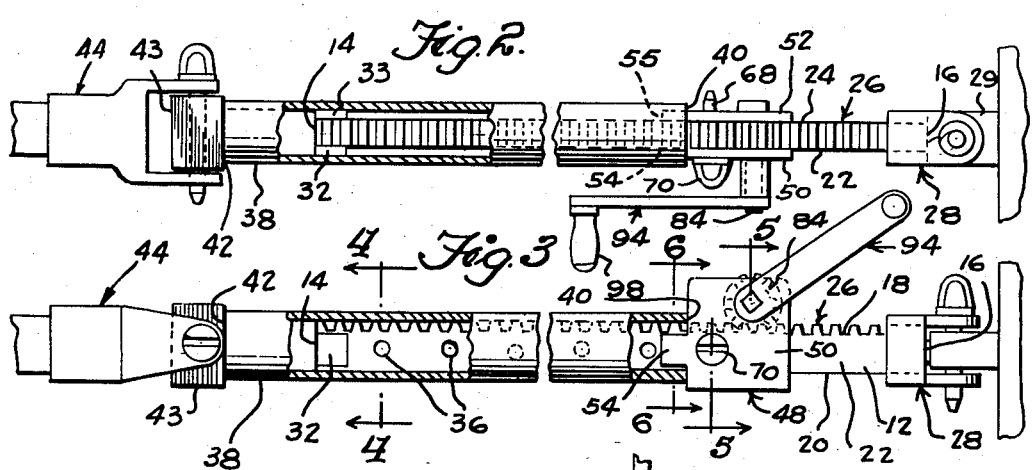
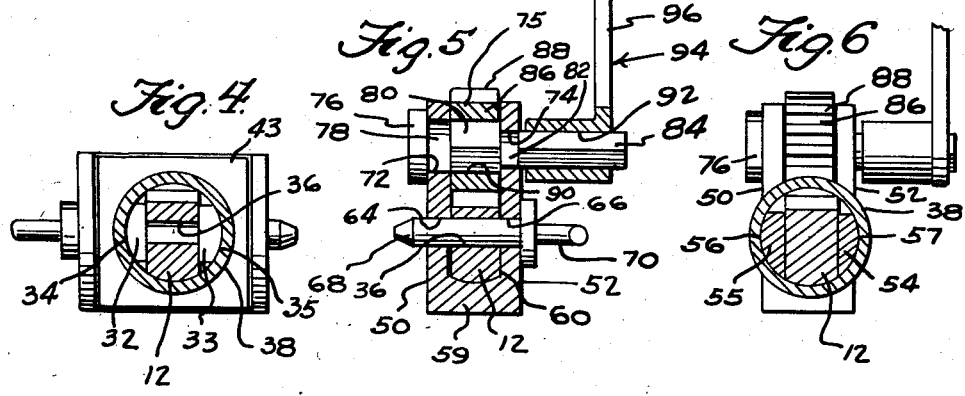
INVENTOR.
ANTON H. HABRIGA
BY
McMorrow, Berman & Davidson
ATTORNEYS United States Patent Office 2,894,766
Patented July 14, 1959

2,894,766
HITCH
Anton H. Habriga, South Milwaukee, Wis.
Application June 20, 1958, Serial No. 743,290
2 Claims. (Cl. 280—482)

This invention relates generally to means for effecting connection between two vehicles, commonly known as a hitch and, more specifically, to a hitch of the extensible variety.

A primary objective of the construction employed herein is to provide a hitch which will eliminate the precise vehicle alignment between a vehicle to be towed and a prime mover which is ordinarily necessary when using conventionally constructed hitches.

A further object is the provision of a hitch so constructed and assembled that a single operator may make use of it without assistance and with a minimum of time and effort.

Another object is the provision of leverage means for the aid of the operator extending or retracting the hitch.

Still another object is the provision of a hitch comprising an elongated slide bar housing, an elongated slide bar telescoped for reciprocation therein, a rack and pinion for adjusting the position of the bar relative to the housing, and means for connecting one end of the housing to a vehicle and one end of the slide bar to another vehicle.

An additional object is the provision of a hitch of the class described supra, the hitch being non-complex in construction and assembly, inexpensive to manufacture, and durable in use.

Other and further objects and advantages will become more readily apparent from a consideration of the following specification when read in conjunction with the annexed drawing, in which:

Figure 1 is a side elevational view of a hitch constructed and assembled in accordance with the teachings of this invention, showing the hitch used to connect a tractor and wagon;

Figure 2 is an enlarged, top elevational view of the hitch, partly broken away to illustrate more clearly the assembly of the device;

Figure 3 is a side elevational view of the hitch, partly broken away and further illustrating the assembly of the hitch;

Figure 4 is an enlarged transverse cross sectional view taken substantially along the vertical plane of line 4—4 of Figure 3, looking in the direction of the arrows;

Figure 5 is a transverse detail cross sectional view, taken substantially along the line 5—5 of Figure 3, looking in the direction of the arrows; and Figure 6 is another transverse detail cross sectional view taken on substantially the vertical plane of line 6—6 of Figure 3, looking in the direction of the arrows.

Proceeding now to relate the several figures of the drawing to a more detailed description of the construction and assembly of this device, it is seen that reference numeral 10 has been employed to identify the hitch in general. The hitch 10 comprises an elongated substantially rectangular slide bar 12 having opposed ends 14, 16, an upper side 18, a lower arcuate side 20, and frontal and rear sides 22, 24. It will be understood that the notations "lower," "upper," "frontal" and "rear" are employed for clarity of description only and are not to be construed as limitations on the invention. The upper side 18 is provided with a plurality of substantially rectangular rack type gear teeth 26 for a purpose to be described below.

The end 16 of the slide bar 12 has a clevis assembly 28 of conventional design fixedly secured thereto in order to effect connection of the hitch with a vehicle, in this illustration with the draw bar 29 of a tractor 30. Fixedly secured to the front and rear sides 22, 24 of the slide bar 12, adjacent the end 14 thereof, are a pair of substantially rectangular stops 32, 33, having remotely disposed arcuately shaped outer sides 34, 35, respectively.

As seen in the drawing, the slide bar 12 is provided with a series of transversely extending apertures 36 formed therein at longitudinally spaced intervals.

The bar 12 is normally telescoped within a substantially hollow cylindrical elongated slide bar housing 38 having opposed ends 40, 42, of which the latter is integral with an enlarged hollow square collar 43. The collar 43 is adapted to be connected by conventional means with a second clevis assembly 44 mounted on another vehicle, such as a wagon 46.

The opposed end 40 of the housing 38 has affixed thereto a leverage means assembly 48 comprising a pair of substantially rectangular side plates 50, 52, arranged parallel to the front and rear sides 22, 24 of the slide bar 12, and having a pair of substantially rectangular projections 54, 55 having their remotely disposed outer sides 56, 57 arcuately formed, the outer sides 56, 57 being fixedly secured to the interior of the end 40 of the housing 38 so as to serve as terminal stops for the reciprocation of the slide bar 12.

The side plates 50, 52 adjacent their respective lower ends are separated by a substantially rectangular spacer block 59 having an arcuate inner surface 60 to slidably support the arcuate lower side 20 of the slide bar 12. The plates 50, 52 also have coaxial openings 64, 66 formed therein and extending transversely therethrough which lie substantially in the horizontal plane of the apertures 36 in the slide bar 12, thus making it possible to co-align these apertures for insertion of a substantially cylindrical lock pin 68 having a substantially U-shaped handle 70 (see Figure 5) to prevent relative movement between the slide bar 12 and the housing 38. The plate 50 has another opening termed 72 formed therein having a common axis with an opening of lesser diameter 74 formed in the plate 52.

Reference numeral 75 denotes an elongated shaft or axle having an enlarged head 76 at one end thereof. Immediately adjacent the head 76 the shaft 75 is necked down to form a substantially cylindrical bearing 78 which is integral with an axial extension 80 having a substantially rectangular configuration. For reasons which will become apparent below, the diagonals of the extension 80 are equal to the diameter of the bearing 78.

Integral with and projecting laterally from the other side of the extension 80 is a second cylindrical bearing 82 having a smaller diameter than the diameter of the bearing 78, and projecting axially therefrom is a squared end 84 the diagonals of which are equal to the diameter of the second bearing 82.

Disposed between the plates 50, 52 is a pinion 86 having teeth 88 meshing with the rack gear teeth 26 and having a central substantially rectangular opening 90 extending transversely therethrough aligned with the openings 72, 74. The opening 90 has diagonals substantially equal to the diameter of the opening 72.

The pinion 86 is rotatably supported between the plates 50, 52 on the axle 75, the bearings 78 and 82 being journalled for rotation in the openings 72, 74. The axial extension 80 is secured within the squared opening 90, and the squared end 84 projects laterally from the side plate 50 to receive the hollow squared socket 92 of a socket wrench 94 having an offset crank handle 96 to which is connected an offset handle 98.

In operation, the hitch 10 is secured to either the wagon 46 or the tractor 30 and one vehicle is placed roughly in hitching alignment in relation to the other. The lock pin 68 is removed from the hitch 10 and, then, the crank handle 96 is utilized to either extend or retract the slide bar 12 to a position where the clevis 28 or 44 may be connected to the other vehicle.

When the above is completed, the crank handle is again utilized to co-align the openings 64, 66 with one of the apertures 36 and the pin 68 is reinserted to lock the hitch 10.

At times it may be desired to adjust the length of the hitch 10. By use of the leverage means assembly 48, a single operator is able to cause the device to perform this function. In effecting elongation of the hitch 10, disconnection between the slide bar 12 and its housing 38 is prevented by engagement of the stops 32, 33 with the projections 54, 55, respectively.

While this description and illustration have referred to the hitch 10 for use in connection with a tractor 30 and wagon 46, it will be understood that this hitch is equally applicable to other types and classes of vehicles.

Thus, having described and illustrated a single embodiment of this invention, it will be understood that this embodiment is offered merely by way of example, and that this invention is to be limited only by the scope of the appended claims.

What is claimed is:

1. An extensible vehicle hitch comprising an elongated substantially rectangular slide bar having a pair of opposed ends, one of said ends of said bar having clevis means for connection with a vehicle, one side of said bar having a series of teeth thereon, said slide bar being telescoped within an elongated substantially tubular slide bar housing having a pair of opposed ends, stop means on the other end of said slide bar projecting laterally from opposite sides thereof, said other end of said housing having a pair of substantially rectangular opposed plates secured thereto, said plates having substantially rectangular projections secured within said end of said housing disposed in the path of movement of said stop means of said slide bar to prevent the removal of said bar from said housing, said plates having coaligned openings formed therein adjacent said projections, said slide bar having a plurality of apertures formed therein for selective alignment with said openings, and a locking pin for extension through said openings and a selected one of said apertures to lock the slide bar and slide bar housing against relative axial movement, an axle rotatably supported on said plates, a pinion mounted for rotation with said axle and disposed between said plates and meshing with said teeth on said slide bar, and a crank handle secured to effect rotation of said pinion and consequent relative movement between said slide bar and said housing.

2. An extensible vehicle hitch comprising an elongated substantially rectangular slide bar having a pair of opposed ends, one of said ends of said bar having clevis means for connection with a vehicle, one side of said bar having a series of teeth thereon, said slide bar being telescoped within an elongated substantially hollow cylindrical slide bar housing having a pair of opposed ends, stop means on the end of said slide bar received within said bar housing, said stop means projecting from opposite sides of said slide bar and having rounded outer sides to bear against the adjacent sides of the slide bar housing, said other end of said housing having a pair of substantially rectangular opposed plates secured thereto, said plates having substantially rectangular projections secured within said end of said housing disposed in the path of movement of said stop means of said slide bar to prevent the removal of said bar from said housing, said plate having coaligned openings formed therein adjacent said projections, said slide bar having a plurality of apertures formed therein for selective alignment with said openings, a locking pin for extension through said openings and a selected one of said apertures to lock the slide bar and slide bar housing against relative axial movement, an axle rotatably supported on said plates, a pinion mounted for rotation with said axle and disposed between said plates and meshing with said teeth on said slide bar, a crank handle secured to said axle for effecting rotation of said pinion and consequent relative movement between said slide bar and said housing, and the side of said slide bar opposed from said side having said gears thereon being of arcuate cross-sectional configuration and bearing against the adjacent side of said slide bar housing, said stop means and said last named side of said slide bar supporting said slide bar for axial movement thereof in said slide bar housing.

References Cited in the file of this patent

UNITED STATES PATENTS

| 2,497,234 | Mylie | Feb. 14, 1950 |
| 2,693,368 | Petron | Nov. 2, 1954 |

FOREIGN PATENTS

| 312,340 | Italy | Nov. 8, 1933 |